United States Patent [19]
Riley

[11] Patent Number: 5,245,758
[45] Date of Patent: Sep. 21, 1993

[54] T-SQUARE ATTACHMENT FOR CARPENTER'S LEVEL

[76] Inventor: A. Joseph Riley, 562 Breezy Bluff, Battle Creek, Mich. 49017

[21] Appl. No.: 976,761

[22] Filed: Nov. 16, 1992

[51] Int. Cl.⁵ .......................... B43L 7/02; G01C 9/26
[52] U.S. Cl. ........................................ 33/451; 33/479; 33/376; 33/478
[58] Field of Search ................ 33/370, 371, 376, 451, 33/468, 474, 478, 479

[56] References Cited

U.S. PATENT DOCUMENTS

| | | | |
|---|---|---|---|
| 120,675 | 11/1871 | Shelley | 33/451 |
| 517,935 | 4/1894 | Schnell | 33/376 |
| 602,131 | 4/1898 | Gottlock | 33/478 |
| 867,556 | 10/1907 | Campbell | 33/451 |
| 1,086,545 | 2/1914 | Meiser et al. | 33/451 |
| 1,740,597 | 12/1929 | Hoyer | 33/451 |
| 2,502,235 | 3/1950 | Schultes et al. | 33/371 |
| 2,761,215 | 9/1956 | Macklanburg . | |
| 2,900,729 | 8/1959 | Basile | 33/451 |
| 2,998,655 | 9/1961 | White | 33/451 |
| 4,279,081 | 7/1981 | Wing et al. . | |
| 4,327,501 | 5/1982 | Hurt | 33/451 |
| 4,653,194 | 3/1987 | Kim | 33/451 |
| 4,825,559 | 5/1989 | Santos . | |
| 4,910,876 | 3/1990 | Channell . | |

FOREIGN PATENT DOCUMENTS

| | | | |
|---|---|---|---|
| 321863 | 6/1920 | Fed. Rep. of Germany | 33/479 |
| 1263894 | 5/1961 | France | 33/479 |
| 322307 | 6/1957 | Switzerland | 33/451 |

Primary Examiner—Thomas B. Will
Attorney, Agent, or Firm—Haugen and Nikolai

[57] ABSTRACT

An attachment for a carpenter's level to create a T-square comprises an integrally molded head member having a rectangular socket formed therein and extending perpendicular to reference edges defined by opposed parallel spaced-apart side walls. By inserting one end of a spirit level into the socket and by tightening down a set screw, the head member is releasably attached to the carpenter's level and with the longitudinal axis of that level intersecting the bottom edges of the head member at an angle of 90°.

8 Claims, 1 Drawing Sheet

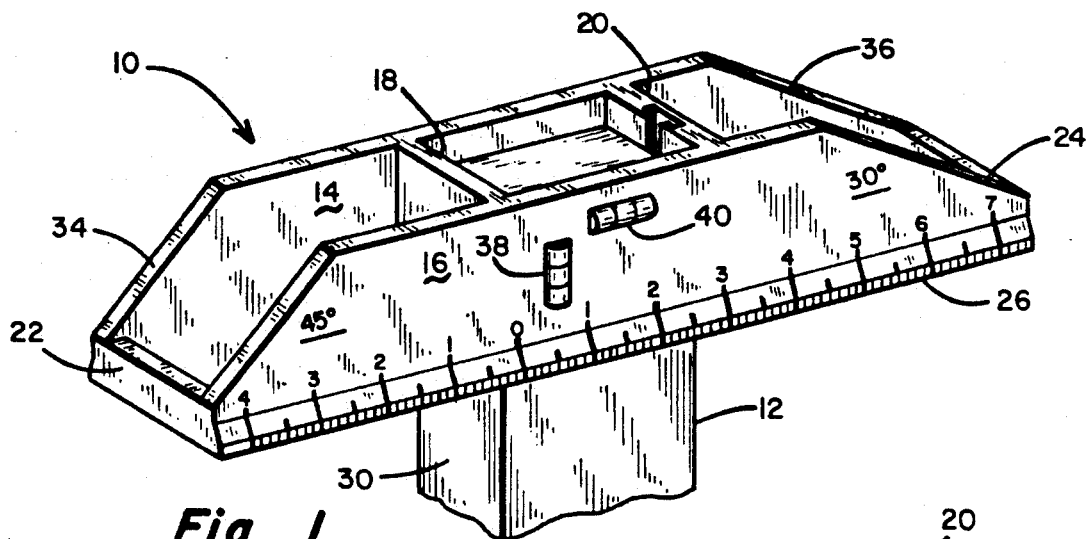

T-SQUARE ATTACHMENT FOR CARPENTER'S LEVEL

BACKGROUND OF THE INVENTION

I. Field of the Invention

This invention relates generally to carpentry tools, and more particularly to a device which may be readily attached to a standard carpenter's level to create a T-square useful for laying out patterns on plywood panels, gypsum board and similar materials.

II. Discussion of the Prior Art

A T-square is an instrument or tool commonly used by draftsmen and builders for drawing or scribing straight lines on panels, with the line extending perpendicular to a reference edge of that panel. It generally comprises an elongated rectangular blade to which is attached a head member where the head member includes a straight bottom edge which is displaced out of the plane of the rectangular blade with that bottom edge being oriented precisely at 90° to the two side edges of the elongated rectangular blade.

In commercial and residential building, workmen often must lay out rectangular patterns on sheet material, such as wall board, plywood, wallpaper, etc. Such workmen will routinely have a carpenter's level as one of his/her tools. However, because of its shape, such workers will not routinely include a T-square in their tool boxes. While a carpenter's level along with a measuring tape can be used to lay out a pattern on sheet material, it is necessary when using that approach to measure in from a reference edge on the workpiece and mark a series of points and then use an edge of the carpenter's level to draw a series of straight line segments extending through the marks. This procedure is time consuming when contrasted to the use of a T-square for the same purpose. With a T-square, of course, it is only necessary to measure and mark at one point because the T-square itself will insure perpendicularity of the line being drawn through that single mark.

Accordingly, it would be helpful and convenient for a worker in the building trades to have a readily portable attachment for a carpenter's level that would convert the assembly into a T-square type tool. There is disclosed in the prior art the idea of attaching a separate head member to a carpenter's level to facilitate the squaring of corners when framing in doorways, windows and the like. In this regard, reference is made to the U.S. Pat. No. 2,761,215 to Macklanberg and the U.S. Pat. No. 4,910,876 to Channell. Neither of these devices, however, would be suitable as a T-square because neither provides a head attachment whose reference edge is offset from the plane of the level so as to allow the tool to cooperate with the edge of a sheetrock panel or the like to be marked and cut.

The U.S. Pat. No. 4,825,559 to Santos discloses a T-square type tool with a removable head, but the blade portion of the T-square is merely a flat ruler or scale and not a carpenter's level.

OBJECTS

It is accordingly a principal object of the present invention to provide a head member which is adapted to be easily assembled onto and removed from one end of a standard carpenter's level and which, when attached, creates a T-square.

Another object of the invention is to provide a head member for a carpenter's level that facilitates the layout of lines on panels along which cuts are later to be made and which incorporates features which facilitate the layout of lines at angles other than 90°.

Yet a further object of the invention is to provide a device attachable to a carpenter's level for creating a T-square where the head member is sufficiently rugged and of a size that it can be transported in a worker's toolbox, thus making it convenient to use.

SUMMARY OF THE INVENTION

An advance in the state of the art is achieved by providing an attachment for an elongated carpenter's level for converting that level to a T-square. In accordance with this invention, the attachment comprises a head member having a pair of side walls which are held in parallel, spaced-apart relation by first and second transversely extending, parallel, spaced-apart intermediate walls, where the spacing between the intermediate walls and between the pair of side walls is greater than the width dimension and depth dimension of the carpenter's level, respectively. This allows the carpenter's level to be inserted into the cavity or opening defined by the intermediate walls and the pair of side walls. Cooperating with one of the intermediate walls is a threaded screw which is used to releasibly clamp the head member onto the end portion of the carpenter's level. Because the level is inset relative to the exterior edges of the head member, a flange surface perpendicular to the side edges of the level is created, allowing that flange member to cooperate with a reference edge on the sheet or panel to be marked or scribed. The flange area is provided with scale markings which facilitate measurements. Furthermore, the upper edges of each of the side walls is beveled proximate the opposed corners thereof at predetermined angles facilitating the drawing of 30° angles, 60° angles and 45° angles.

DESCRIPTION OF THE DRAWINGS

The foregoing features, objects and advantages of the invention will be understood from the following detailed description of the preferred embodiment, especially when considered in conjunction with the accompanying drawings in which:

FIG. 1 is a perspective view of the head member shown attached to a carpenter's level, creating a T-square;

FIG. 2 is a side elevation of the device of FIG. 1;

FIG. 3 is a top view of the preferred embodiment;

FIG. 4 is a right end view thereof; and

FIG. 5 is a cross-section taken along line 5—5 in FIG. 4.

DESCRIPTION OF THE PREFERRED EMBODIMENT

Referring first to FIG. 1, there is indicated generally by numeral 10 an attachment for a carpenter's level for creating a T-square. In this view, a segment of the carpenter's level is identified by numeral 12. The detachable head member is seen to comprise a pair of side walls 14 and 16 which are maintained in parallel, spaced-apart relation by first and second transversely extending intermediate walls 18 and 20. The head member 10 is preferably formed from a plastic, such as polycarbonate, in a molding operation, such that the intermediate walls 18 and 20 are integrally joined to the side walls 14 and 16. Also integrally molded and extending between the side walls 14 and 16 are end walls 22 and 24.

The bottom edges 26 and 28 of the side walls 14 and 16 are of greater thickness than the remainder of the side walls to thereby provide a greater surface area along the bottom edges for engaging an edge of the sheet or panel, such as when the T-square is being used as a guide in marking a panel or cutting gypsum board. As is shown in FIG. 1, it has been found convenient to provide a measuring scale on the exposed faces of either or both of the side walls 14 and 16 proximate the bottom flanges 26 and/or 28. The zero or reference mark is positioned to be in alignment with the side edge 30 of the carpenter's level 12 when that level is inserted into the opening defined by the spaced-apart intermediate walls 18 and 20. This, of course, allows for accurate measurements being made either to the left or to the right from a line drawn along the edge surface 30.

To releasibly secure the head member 10 to the carpenter's level 12, a threaded cap screw 32 extends through the intermediate wall 20 as can best be seen in the top view of FIG. 3. More particularly, as shown in FIG. 3, a hole is drilled through the thickness dimension of the intermediate wall 20 and there is fitted into a channel 33 in that wall a metal nut 35 having threads for mating with those on the cap screw 32. It is apparent, then, when the spirit level 12 is fitted into the opening defined by the parallel intermediate walls and parallel side walls, by tightening the cap screw against the side edge of the carpenter's level 30, the surface of the intermediate wall 18 tightly engages the side edge 30 of the level, clamping the head to the level.

With particular reference now to FIG. 2, it can be seen that the upper right and left corners of each of the side walls 14 and 16 is beveled at predetermined angles with the left end 34 extending at an angle of 45° to the horizontal and the right end 36 extending at an angle of 30° to the horizontal. This feature facilitates the layout of lines when creating patterns involving those commonly adopted angles.

It has also been found convenient to partially embed spirit level bubble tubes 38 and 40 into the side wall 16 with the bubble tube 38 extending generally parallel to the intermediate wall 18 and the bubble tube 40 having its axis perpendicular to that wall. This addition comes in handy when the T-square is to be used in situations where there may not be a straight reference edge on the workpiece with which the flanged lower edge 26 or 28 of the head member 10 can be abutted.

With no limitation intended, the length of the head member may be about 12 inches and the opening defined by the intermediate walls and the opposed side walls may be 1½ in. by 2 3/5 in. An opening this size has been found to accommodate most carpenter's levels currently on the market, irrespective of whether the level has a rectangular cross-section or a I-shaped cross-section. The height dimension of the head member may, for example, be about 2½ in.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A removable attachment for a carpenter's level for converting said carpenter's level to a T-square, said carpenter's level being of the type including an elongated body with a pair of opposed edge surfaces of a predetermined length and width dimension and a first spirit level bubble mounted in said body for indicating when said opposed edge surfaces are horizontal and a second spirit level bubble mounted in said body for indicating when said opposed edge surfaces are perpendicular to the horizontal, comprising:

(a) a head member having a pair of elongated, generally rectangular side walls, each defining a reference edge along the length dimension thereof which is greater in length than the width of said edge surfaces of said carpenter's level, said side walls being held in parallel, spaced-part relation by first and second transversely extending parallel, spaced-apart intermediate walls and parallel, spaced-apart, transversely extending end walls, said intermediate walls and said side walls defining a rectangular opening for receiving said body of said carpenter's level therein with said reference edge of said walls extending perpendicular to said length dimension of said carpenter's level; and (b) means cooperating with one of said intermediate walls for releasibly clamping said head member to said carpenter's level.

2. The attachment as in claim 1 wherein each of said side walls has opposed corners beveled at predetermined angles relative to said reference edge thereof.

3. The attachment as in claim 2 wherein the predetermined angles are 30° and 45°.

4. The attachment as in claim 1 wherein said means for releasably clamping comprises a threaded screw extending through a threaded member contained in one of said intermediate walls.

5. The attachment as in claim 4 wherein each of said side walls has opposed corners beveled at predetermined angles relative to said reference edge thereof.

6. The attachment as in claim 1 wherein at least one of said pair of side walls includes a spirit level bubble tube extending parallel to said reference edge.

7. The attachment as in claim 6 and further including a second spirit level bubble tube extending perpendicular to said reference edge.

8. The attachment as in claim 1 wherein at least one of said pair of side walls includes a measuring scale extending along said reference edge of at least one of said pair of side walls.

* * * * *